(12) United States Patent
Sfar

(10) Patent No.: US 8,705,535 B2
(45) Date of Patent: Apr. 22, 2014

(54) METHOD FOR PROCESSING PACKETS OF THE IP TYPE INTENDED TO BE CARRIED OVER A COMMUNICATIONS CHANNEL OF A WIRELESS NETWORK, AND EQUIPMENT FOR SAME

(75) Inventor: Safouane Sfar, Le Mans (FR)

(73) Assignee: St-Ericsson SA, Plan-les-Ouates (CH)

( * ) Notice: Subject to any disclaimer, the term of this patent is extended or adjusted under 35 U.S.C. 154(b) by 101 days.

(21) Appl. No.: 13/319,144

(22) PCT Filed: May 3, 2010

(86) PCT No.: PCT/EP2010/055960
§ 371 (c)(1),
(2), (4) Date: Jan. 11, 2012

(87) PCT Pub. No.: WO2010/128009
PCT Pub. Date: Nov. 11, 2010

(65) Prior Publication Data
US 2012/0099531 A1 Apr. 26, 2012

(30) Foreign Application Priority Data
May 6, 2009 (FR) .................................. 09 53015

(51) Int. Cl.
*H04W 4/00* (2009.01)
(52) U.S. Cl.
USPC .......................................... 370/392; 370/474
(58) Field of Classification Search
None
See application file for complete search history.

(56) References Cited

U.S. PATENT DOCUMENTS

| 2002/0105971 | A1* | 8/2002 | Tourunen et al. | 370/469 |
| 2005/0008013 | A1 | 1/2005 | Jamieson et al. | |
| 2005/0071517 | A1 | 3/2005 | O'Mahony | |
| 2008/0008175 | A1* | 1/2008 | Park | 370/390 |
| 2008/0260389 | A1* | 10/2008 | Zheng | 398/115 |
| 2008/0310449 | A1* | 12/2008 | Cha et al. | 370/474 |
| 2009/0046631 | A1* | 2/2009 | Meylan et al. | 370/328 |
| 2009/0141670 | A1* | 6/2009 | Duncan Ho | 370/328 |

(Continued)

FOREIGN PATENT DOCUMENTS

GB 2 399 716 A 9/2004

OTHER PUBLICATIONS

French Search Report issued in corresponding International Application No. PCT/EP2010/055960, mailing date May 5, 2010.

(Continued)

*Primary Examiner* — Hassan Phillips
*Assistant Examiner* — Duc Duong
(74) *Attorney, Agent, or Firm* — Patent Portfolio Builders PLLC

(57) ABSTRACT

A method for processing packets of the IP type within equipment of a wireless communications network comprising an encapsulation of the packets within frames carried over a communications channel of the wireless network. The said encapsulation comprises a first encapsulation of the signalling packets of the IP type within a frame of a first type containing an indication associated with this type of packet, then an additional encapsulation of the said frame of the first type within a frame of a second type different from the first type, and a second encapsulation of the packets transporting the user data of the IP type within a frame of a third type then an additional encapsulation of the said frame of the third type within a frame of the second type.

10 Claims, 6 Drawing Sheets

(56) References Cited

U.S. PATENT DOCUMENTS

2009/0268613 A1* 10/2009 Sagfors .................. 370/235
2010/0041402 A1*  2/2010 Gallagher et al. ......... 455/435.1
2010/0041403 A1*  2/2010 Khetawat et al. ......... 455/435.1
2010/0041418 A1*  2/2010 Edge et al. ................ 455/456.2
2010/0135215 A1*  6/2010 Tang et al. ................ 370/328
2011/0292914 A1* 12/2011 Sachs et al. ............... 370/332

OTHER PUBLICATIONS

International Search Report issued in corresponding International Application No. PCT/EP2010/055960, mailing date Jun. 28, 2010.
NEC: S1X2 Sequence No. Based Reordering, R2-063251, Internet Citation, Oct. 6, 2006, pp. 1-3, XP002483949, URL: http://www.3gpp.org/ftp/tsg_ran/WG2_RL2/TSGR2_56/Documents/R2-063251.zip, entire document.

* cited by examiner

METHOD FOR PROCESSING PACKETS OF THE IP TYPE INTENDED TO BE CARRIED OVER A COMMUNICATIONS CHANNEL OF A WIRELESS NETWORK, AND EQUIPMENT FOR SAME

The present invention relates to the field of wireless communications and, more particularly, the transport of IP (Internet Protocol, according to a term well known to those skilled in the art) packets over a wireless network. It notably relates to the processing of the IP packets implemented within equipment of a wireless network prior to their transport over the said network. Such equipment may, for example, be base stations or wireless communications devices, such as cellular mobile telephones.

The invention is advantageously applicable to, but not limited to, communications systems governed by the UMTS or LTE standards. Here, the communications are organized in the form of layers. When going from the IP layer to the layers specific to the wireless network, a software module, sometimes directly referred to as "PDCP" since it implements the PDCP (Packet Data Convergence Protocol), is currently used. A PDCP module is provided for example in a base station or in a base-station controller (also referred to as "Radio Network Controller" or "RNC" in the framework of the UMTS standard) and a correspondingly equivalent PDCP module is provided in the wireless device, for example the cellular mobile telephone.

According to one embodiment, additional functionalities are provided to an existing PDCP module so as to notably provide two different encapsulations depending on the type of data carried in the IP packet, which can allow an IP network to be interfaced with a wireless communications network in such a manner as to obtain a better quality of service from end to end.

According to one aspect, a method is provided for processing packets of the IP type within equipment of a wireless communications network comprising an encapsulation of the packets within frames carried over a communications channel of the wireless network.

According to a general feature of this aspect, the said encapsulation comprises a first encapsulation of the signalling packets of the IP type within a frame of a first type, for example a frame of the RRC type, containing an indication associated with this type of packet, then an additional encapsulation of the said frame of the first type within a frame of a second type, for example a frame of the RLC type, different from the first type, and an encapsulation of the packets transporting the user data of the IP type within a frame of a third type, for example a frame of the PDCP type, then an additional encapsulation of the said frame of the third type within a frame of the second type.

Thus, this can allow the IP signalling to be separated within the wireless network with respect to the IP data. In addition, depending on the type of frame chosen, certain functionalities may be added specifically to the transport of the signalling packets of the IP type. Furthermore, thanks to the indication contained in the frames of the first type transporting the IP signalling packets, these frames can easily be separated from the other frames of the first type.

According to one embodiment, the indication is added into the header of the frame of the first type.

According to one additional embodiment, each packet transporting the user data of the IP type contains an indication of quality of service, and this indication of quality of service is transposed into the header of the frame of the third type encapsulating the said packet.

Thus, an order of priority is established amongst the packets transporting the user data of the IP type. A higher priority packet will be transmitted in a higher priority frame. This allows a better quality of service and continuity in the wireless network of the IP quality policy to be provided.

Advantageously, in the case of the LTE standard, the said encapsulation of the signalling packets of the IP type furthermore comprises an additional encapsulation of the frame of the first type within a frame of the third type, for example of the PDCP type, then an encapsulation of the frame of the third type within the frame of the second type.

According to another aspect, equipment of a wireless communications network is provided comprising first means configured for delivering packets of the IP type, and encapsulation means configured for encapsulating the packets within frames intended to be carried over a communications channel of a wireless network.

According to a general feature of this other aspect, the said encapsulation means comprise a first encapsulation block configured for carrying out an encapsulation within a frame of a first type, a second encapsulation block configured for carrying out an encapsulation within a frame of a second type, different from the first type, a third encapsulation block comprising two sub-blocks configured for carrying out an encapsulation within a frame of a third type, and the equipment furthermore comprises control means capable, by means of the first sub-block of the third block, of delivering a signalling packet of the IP type to the first encapsulation block then of delivering the said frame of the first type to the second encapsulation block, the first block furthermore being capable of incorporating into the frame of the first type an indication associated with this type of packet, and the control means are capable of delivering a packet of data of the IP type to the second sub-block of the third encapsulation block then of delivering the said frame of the third type to the second encapsulation block.

Advantageously, the first block is configured for incorporating the said indication into the header of the frame of the first type.

According to another embodiment, each packet transporting the user data of the IP type contains an indication of quality of service, and the second sub-block of the third block is furthermore configured for transposing the said indication of quality of service into the header of the frame of the third type encapsulating the said packet.

Preferably, the control means are furthermore capable of routing the frames of the first type towards the first sub-block of the third encapsulation block then of routing the resulting frames towards the second block.

According to another additional embodiment, the equipment comprises a module of the PDCP type incorporating the third encapsulation block.

According to a final embodiment, the equipment forms a wireless communications device, for example a cellular mobile telephone.

Other advantages and features of the invention will become apparent upon studying the detailed description of embodiments, taken by way of non-limiting examples and illustrated by the appended drawings, in which:

FIG. 1 shows the positioning of PDCP modules, referenced MPDCPi, within wireless networks of the UMTS or LTE type.

In the UMTS network, a module MPDCP1 is located within the radio network controller RNC.

In the case of the LTE network, the base station SB incorporates the radio network controller, and thus it therefore incorporates the module MPDCP1.

In the two generations of wireless network, a second module MPDCP2 is located in the user wireless device ASF capable of communicating with the base station SB or the radio network controller RNC via a communications channel CH.

Figure 1:
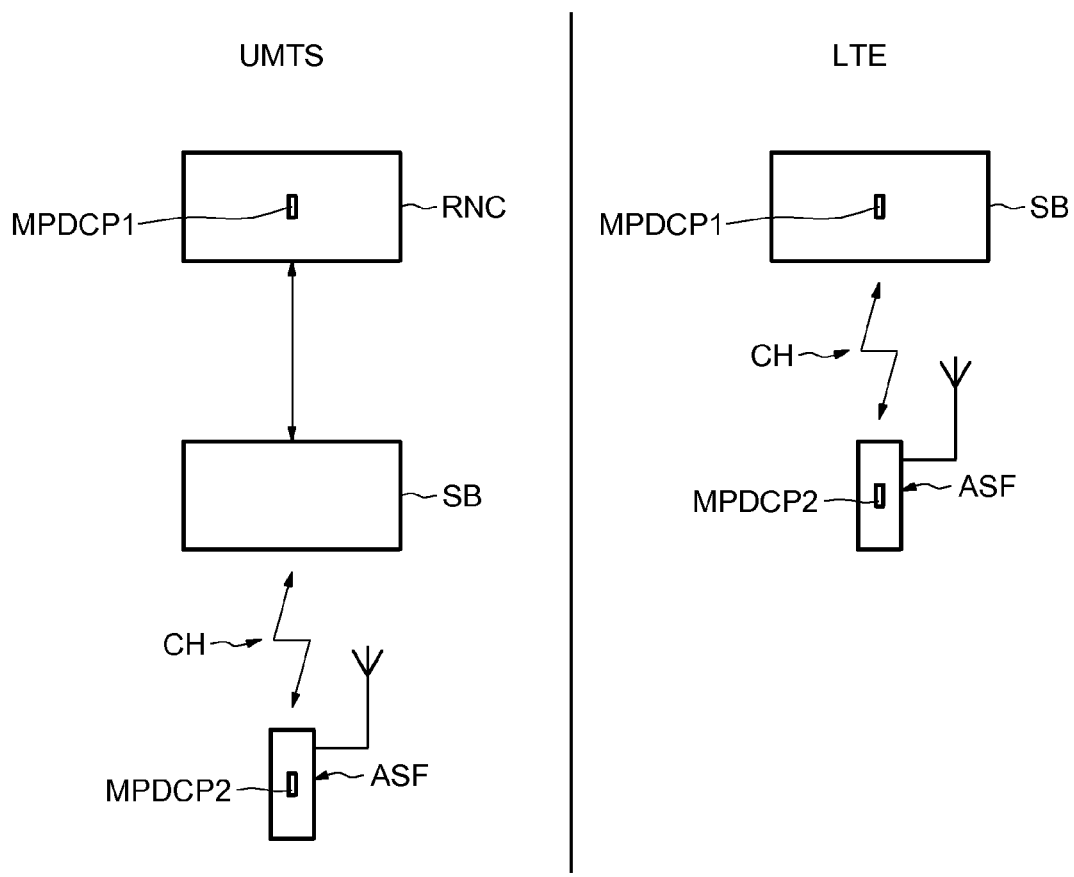
FIG. 1 illustrates the positioning of PDCP modules within a UMTS and LTE wireless network.
Figure 2:
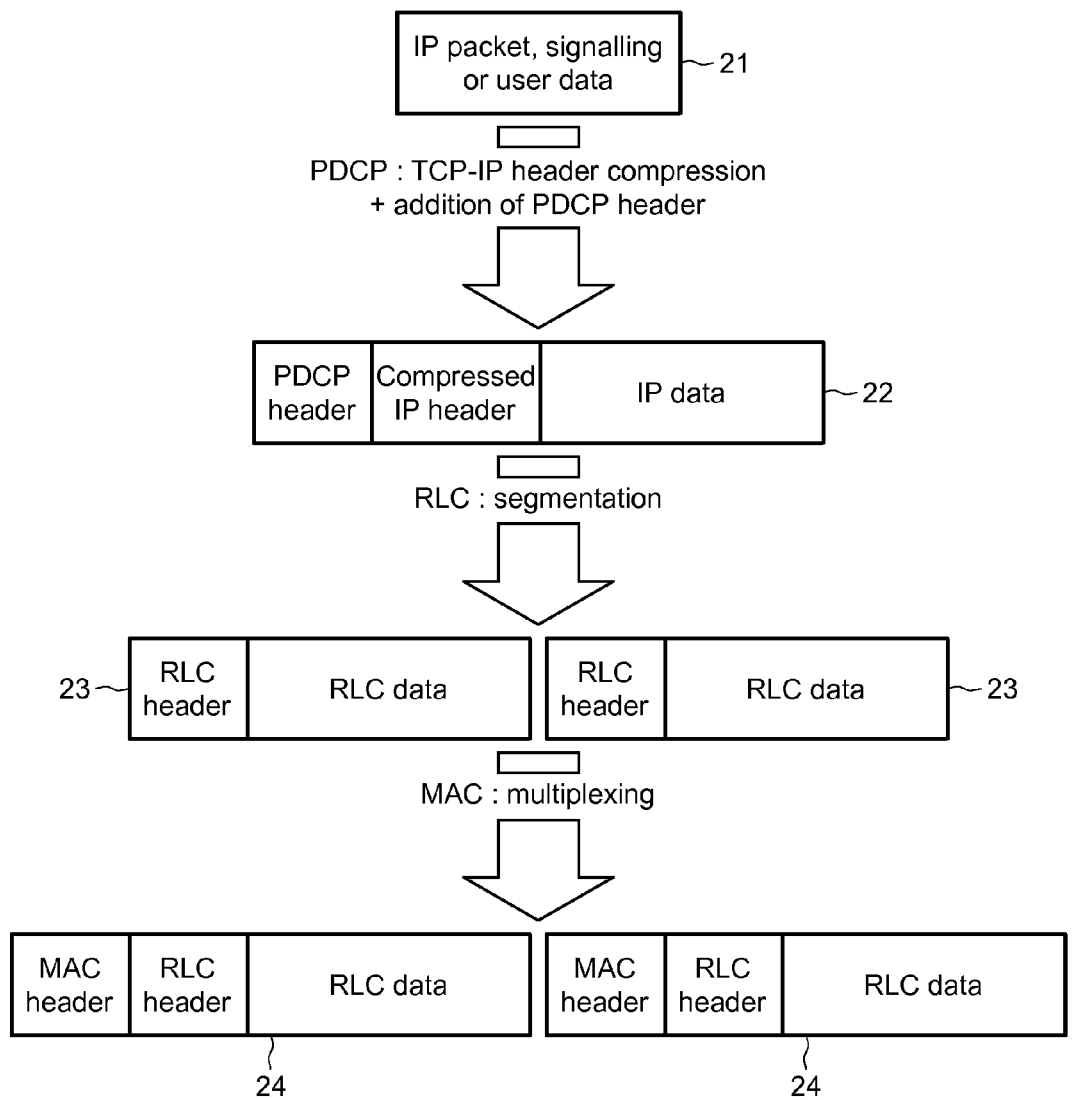
FIG. 2 illustrates schematically the operation of a PDCP module according to the prior art.

FIG. 2 shows the operation of a module MPDCPi according to the prior art, whether it be in the cellular mobile telephone, in the base station or in the radio network controller RNC.

In this figure, reference is made to the operation by layers such as described in the OSI (Open Systems Interconnection) reference model, well known to those skilled in the art.

The IP packet header 21 received by the PDCP module is compressed and a PDCP header is added to it.

The result 22 is sent to another module processing the lower layer, Radio Link Control or RLC well known to those skilled in the art. As can be seen, this other module segments the IP packet and encapsulates it within an RLC frame adding its header.

The result 23 is then transmitted to a module of the MAC layer. The latter, where necessary, multiplexes the RLC frames then encapsulates them within MAC frames. The MAC module then transfers this data 24 to the physical layer.

The data is then coded and modulated for transmission over the wireless network.

It can be seen here that all the IP packets are subjected to the same processing by the module MPDCPi. This processing without differentiation of the IP packets has two drawbacks. On the one hand, an IP packet transporting high priority user data will be handled in the same way as an IP packet carrying lower priority user data. On the other hand, the IP packets transporting the signalling will be handled in the same way as the packets carrying user data.

Figure 3:
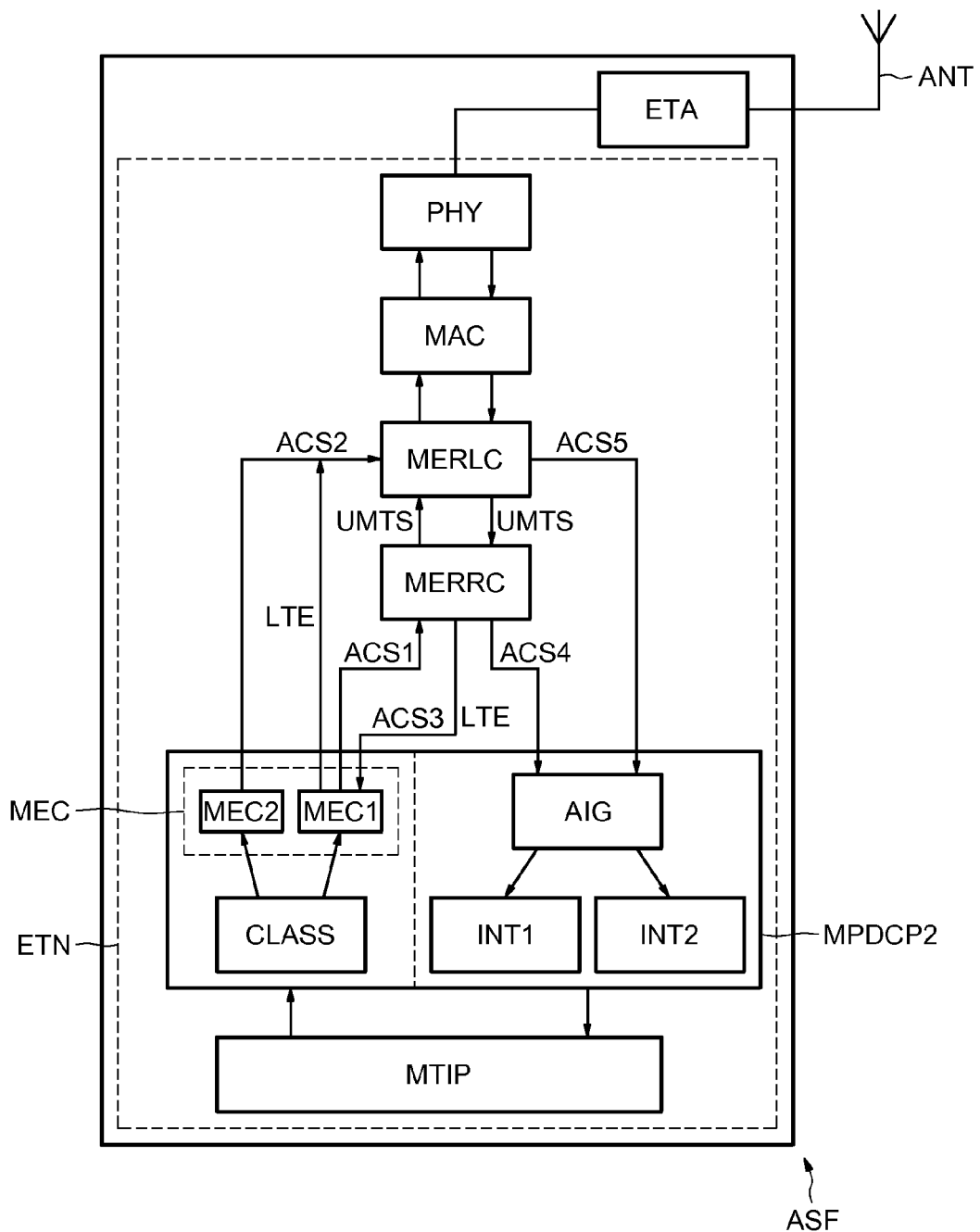
FIG. 3 illustrates one embodiment of a PDCP module according to the invention.

FIG. 3 illustrates an example of an MPDCP module according to the invention, for example incorporated into the device ASF and referenced MPDCP2, with the understanding that the description hereinbelow is valid for the module MPDCP1 of the base station in an LTE network or of the radio network controller RNC in a UMTS network.

The wireless communications device ASF comprises a baseband digital processing stage ETN together with an analogue radiofrequency processing stage ETA and an antenna ANT. The digital processing stage ETN comprises a microprocessor including software modules. Amongst these are:

- the PHY (physical layer processing) module;
- the MAC (Media Access Control) module;
- the first encapsulation block MERRC which processes the RRC frames; it is capable of adding/removing the RRC header; it therefore carries out the encapsulation/decapsulation of the frames of a first type (RRC frames);
- the second encapsulation block MERLC which processes the RLC frames; it is capable of adding/removing the RLC header; it therefore carries out the encapsulation/decapsulation of the frames of a second type (RLC frames);
- the PDCP module MPDCP2; this notably contains a third encapsulation block. This block comprises two sub-blocks MEC1 and MEC2 capable of carrying out an encapsulation within a frame of a third type (PDCP frame); and
- processing means MTIP for IP packets;
- control means CONT that are capable of routing the frames or packets between the two sub-blocks MEC1 and MEC2 and the first and second encapsulation blocks.

The block MERRC is notably dedicated to the signalling frames of the IP type coming from the module MPDCP2 according to the invention. The block MERLC is notably dedicated to the data frames of the IP type coming from the module MPDCP2. The module MPDCP2 is functionally represented divided into two halves, each half representing one direction of transport (transmission or reception).

In the transmission direction, the control means CONT, the classification means CLASS then the first and second sub-blocks and the first and second blocks come into play.

The classification means CLASS are capable of carrying out an analysis of the contents of the IP packets received from the processing means MTIP and of sending the IP signalling packets and the IP packets carrying the user data to the two sub-blocks MEC1 and MEC2, respectively.

The second sub-block MEC2 is capable of encapsulating the IP packets transporting the data within a frame of the third type (PDCP). Then, the control means CONT are capable of sending these frames via the access point ACS2 (Service Access Point, according to a term well known to those skilled in the art) to the second encapsulation block MERLC.

Following the passage of the signalling packets of the IP type in the first sub-block MEC1, the control means CONT are capable of routing them towards the first block MERRC via the access point ACS1.

The first encapsulation block MERRC is capable of encapsulating the IP signalling packets within frames of the first type (RRC). In the case of the LTE standard, the control means CONT are then capable of sending the frames of the first type RRC to the first sub-block MEC1 via the access point ACS3. Then, after the frames RRC have been received by the sub-block MEC1 via the access point ACS3 and they have been encapsulated within a frame of the third type PDCP, the control means CONT are also capable of routing the frames of the third type towards the second block MERLC via the access point ACS2.

In the case of the UMTS standard, the control means CONT are capable of sending the frames of the first type RRC directly to the second encapsulation block MERLC.

The second block MERLC is capable of encapsulating the frames of the third type PDCP or the frames of the first type RRC within a frame of the second type RLC. In other words, it receives PDCP frames containing packets of data of the IP type in the UMTS and LTE standard and signalling packets of the IP type in the LTE standard. It receives RRC frames containing signalling packets of the IP type in the UMTS standard.

In the reception direction, the module MPDCP2 also comprises routing means AIG and processing interfaces INT1 and INT2. The routing means AIG are capable of routing each of the PDCP frames, depending on the means from which it comes, towards the processing interface INT1 or INT2 dedicated to it.

In other words, in the reception direction, the RRC and RLC frames, respectively decapsulated by the blocks MERRC and MERLC and respectively containing the signalling of the IP type and the data of the IP type, are sent to two different access points ACS4 and ACS5 of the module MPDCP2. Depending on the access point, the routing means then route towards the processing interface INT1 or towards the processing interface INT2. The processing interface INT1 is dedicated to the frames coming from the block MERRC containing the signalling of the IP type and the processing interface INT2 is dedicated to the frames coming from the block MERLC containing the data of the IP type. The processing interfaces INT1 and INT2 are functional interfaces with the processing means MTIP.

The means CLASS, AIG and the third block are located in the module MPDCP2. The first and second blocks MERRC and MERLC are coupled with the module MPDCP2.

The means and modules illustrated may for example take the form of software modules or of lines of code.

Figure 4:
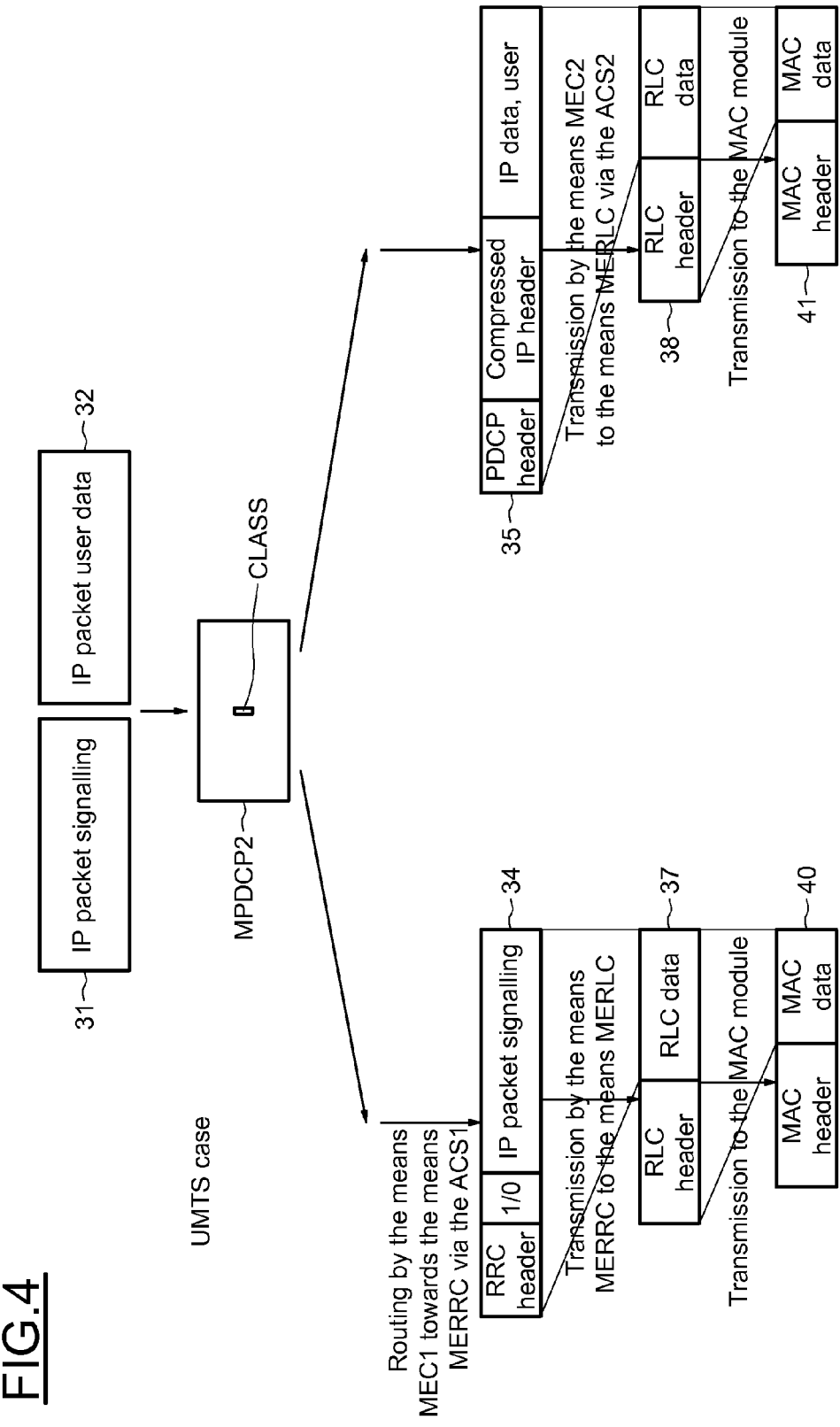
FIGS. 4 and 5 illustrate one example of operation of a PDCP module and of the encapsulation means according to the invention, respectively, during the transmission of an IP packet over the UMTS and LTE wireless network.

FIG. 4 shows the operation of the module MPDCP2, and of the blocks MERRC and MERLC in FIG. 3 in the upload direction (in transmission) according to a first variant. This variant is applicable in the case of a UMTS wireless network.

A classification between the signalling packets of the IP type (31) and the packets transporting data of the IP type (32) may be required. This can be carried out by the classification means CLASS.

The headers of the IP packets transporting the user data are compressed. Then the IP packets are encapsulated within PDCP frames (35). This encapsulation is carried out by the second sub-block MEC2. It adds a PDCP header to the IP packets. The header of the PDCP frame is notably fed information on service quality IPT, this transposition being detailed in FIG. 6. The PDCP frames are then transmitted by the control means CONT to the second encapsulation block MERLC. This block encapsulates them within RLC frames (38). The RLC header can be fed the service quality information which has been added in the PDCP frame. The RLC frames are then transmitted to the MAC module (41) then to the PHY module for their transmission over the channel CH.

The headers of the IP signalling packets (31) are first of all compressed by the module MPDCP2. They are then transmitted without encapsulating in a PDCP frame of the first sub-block MEC1 to the block MERRC by the control means CONT. The block MERRC will encapsulate them (34) within the RRC frames. The RRC header comprises a field holding an indication in the form of a bit 1 or 0. This indication allows the IP signalling to be distinguished from the other types of signalling, NAS (Non-Access Stratum) or RRC, according to acronyms well known to those skilled in the art. In this field, a 1 corresponds for example to the IP signalling and a 0 corresponds to the NAS or RRC signalling. The RRC frames are then transmitted via the control means CONT to the block MERLC. The block MERLC encapsulates them within the RLC frames (37) which are sent to the MAC layer (40) and finally the PHY module for their transmission over the radio interface CH.

Figure 5:
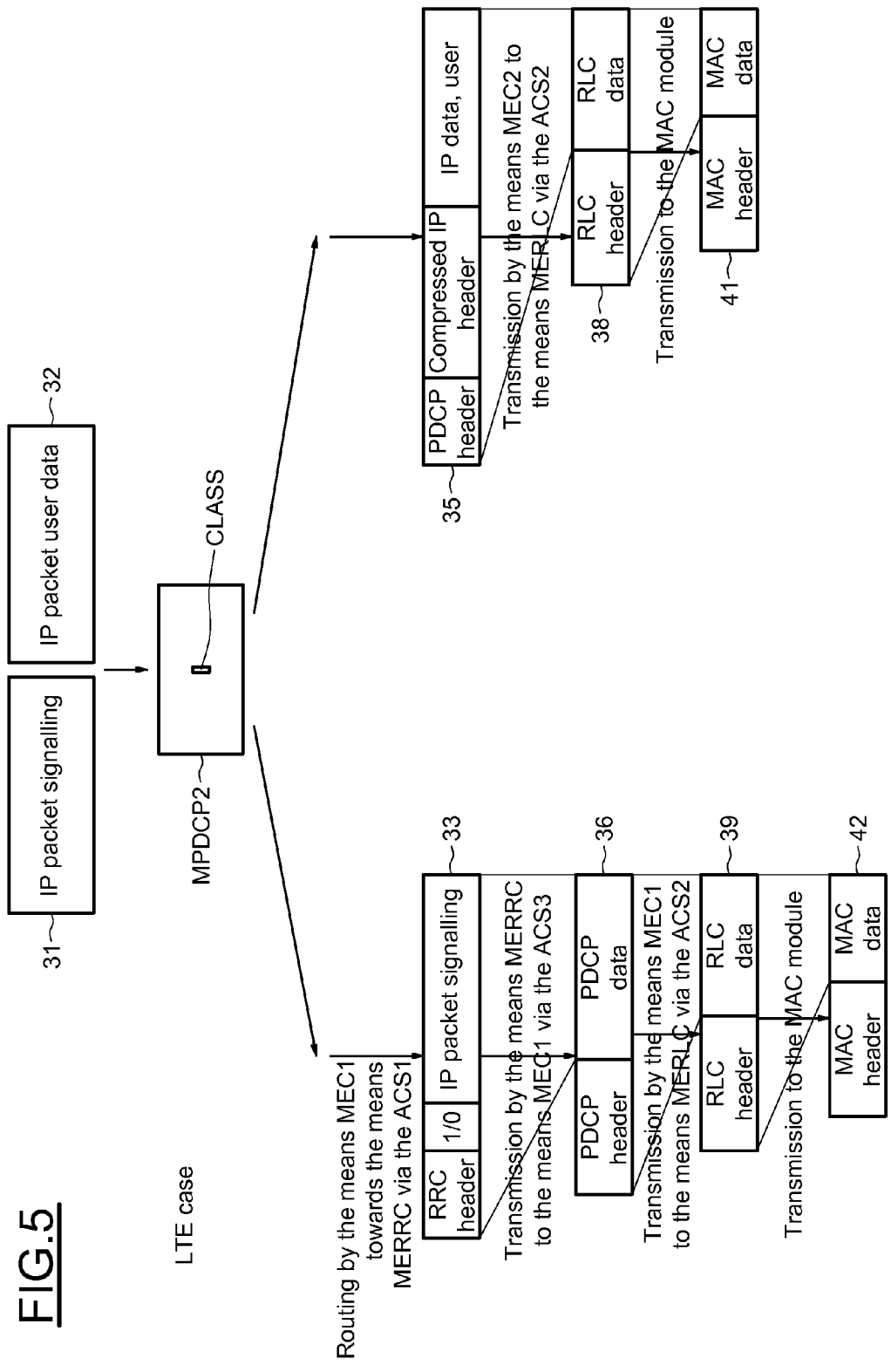

FIG. 5 shows the operation of the module MPDCP2 and of the blocks MERRC and MERLC in FIG. 3 in the upload direction (in transmission) according to a second variant. This variant is applicable to wireless networks of the LTE type.

First of all, the packets transporting the data of the IP type are separated from the packets transporting the signalling of the IP type.

The processing then carried out on the packets transporting the user data of the IP type is identical to that carried out in the first variant considered in FIG. 4.

The headers of the IP signalling packets (31) are firstly compressed by the module MPDCP2. After passing through the first sub-block MEC1 of the module MPDCP2, the packets are transmitted by the control means CONT to the first encapsulation block MERRC. The block MERRC encapsulates them in RRC frames (33). The RRC header, comprising the indication, added by the block MERRC, is identical to that added in the case of the UMTS standard. The RRC frame is transmitted to the first sub-block MEC1 of the module MPDCP2 by the control means CONT. The first sub-block MEC1 encapsulates them within PDCP frames (36) and they are transmitted by the control means CONT to the second block MERLC.

The second block MERLC encapsulates the PDCP frames within RLC frames (39). These are then transmitted to the MAC layer (42) and finally the PHY module for their transmission over the radio interface CH.

In other words, in both variants, the IP packet containing the signalling is sent in the form of a network message across an SRB (Signalling Radio Bearer, according to terms well known to those skilled in the art) dedicated solely to the IP signalling. Since they are transported within specific RRC frames, the IP signalling packets are easily distinguishable from the other signallings (NAS Non-Access Stratum or RRC Radio Resource Control, according to terms well known to those skilled in the art). Moreover, given that the RRC frames support functionalities such as the protection of the integrity, transporting with the RRC frames allows a protection of the integrity to be provided for the IP signalling packets.

Figure 6:
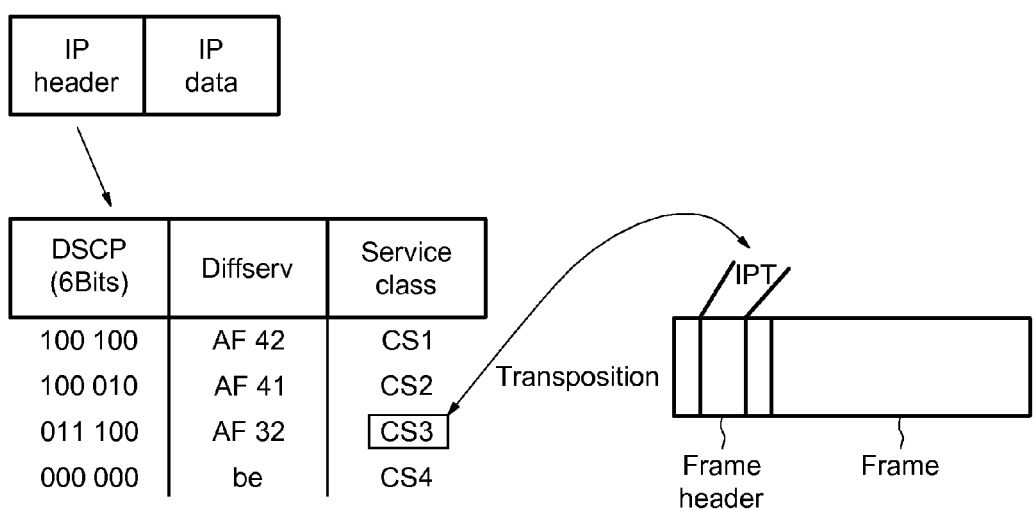
FIG. 6 illustrates a transposition by the PDCP module of the Diffserv class category into an indication of quality of service.

FIG. 6 shows the processing of the module MPDCPi on the user data packets of the IP type. This corresponds to the transposition into the header of the PDCP frame of the service quality indication of the IP header. This indication can also be transposed by the block MERLC and the MAC module into the MAC and RLC header.

As a first step, the Diffserv class (according to an acronym well known to those skilled in the art) of each of the IP packets is determined by the analysis of the DSCP field (according to an acronym well known to those skilled in the art) in the IP header. Then, a UMTS/LTE service class CSi is associated with this class. The value of this class therefore corresponds to the indication of quality of service for the IP packet. This class is then converted into quality of service information IPT which is included in the header of the RLC, PDCP or MAC frame.

In other words, the sub-block MEC2 of the module MPDCPi transposes the indication of quality of service of the header of the IP packet into the header of the PDCP frame. This indication may also be transposed into the header of the RLC frame and into the header of the MAC frame, respectively, by the block MERLC and the MAC module.

By way of example, a UMTS/LTE service class CSi may be the high-definition video class in the streaming class category which can be associated with the Diffserv indication of quality of service AF23. In conclusion, the invention such as has been described allows the IP signalling packets to be transported within frames dedicated to the signalling of the wireless networks. The frames transporting the signalling packets of the IP type are indentifiable and differ both from the frames transporting the conventional signalling of the wireless network and from the frames transporting the IP data packets.

The use of routing means at the receiver allows a frame to be directly routed towards the correct processing interface dedicated to the processing of the type of packets contained in the frame without having to carry out a prior analysis of the packets in order to discover their type (IP signalling or IP user data), and thus allows the speed of processing to be increased.

For example, an SIP (Session Initiation Protocol, according to a term well known to those skilled in the art) module interfaced with the PDCP module according to the invention can receive the packets transporting the SIP signalling directly and can therefore process the SIP signalling without supporting all of the IP functionalities.

The invention claimed is:

1. A method for processing packets of the IP type within equipment of a wireless communications network comprising an encapsulation of the packets within frames carried over a communications channel of the wireless network, wherein the said encapsulation comprises a first encapsulation of the signalling packets of the IP type within a frame of a first type containing an indication associated with this type of packet, then an additional encapsulation of the said frame of the first type within a frame of a second type different from the first type, and an encapsulation of the packets transporting the user data of the IP type within a frame of a third type then an additional encapsulation of the said frame of the third type within a frame of the second type.

2. The method according to claim 1, in which the said indication is added into the header of the frame of the first type.

3. The method according to claim 1, in which each packet transporting the user data of the IP type contains an indication of quality of service, and this indication of quality of service is transposed into the header of the frame of the third type encapsulating the said packet.

4. The method according to claim 1, in which the said encapsulation of the signalling packets of the IP type furthermore comprises an additional encapsulation of the frame of the first type within a frame of the third type then an encapsulation of the frame of the third type within the frame of the second type.

5. Equipment of a wireless communications network comprising first means configured for delivering packets of the IP type, and encapsulation means configured for encapsulating the packets within frames intended to be carried over a communications channel of a wireless network, wherein the encapsulation means comprises:

a first encapsulation block configured for carrying out an encapsulation within a frame of a first type, a second encapsulation block configured for carrying out an encapsulation within a frame of a second type, different from the first type, and a third encapsulation block comprising two sub-blocks configured for carrying out an encapsulation within a frame of a third type, and the equipment furthermore comprises control means capable, by means of the first sub-block of the third block, of delivering a signalling packet of the IP type to the first encapsulation block then of delivering the said frame of the first type to the second encapsulation block, the first block furthermore being capable of incorporating into the frame of the first type an indication associated with this type of packet, and the control means are capable of delivering a packet of data of the IP type to the second sub-block of the third encapsulation block then of delivering the said frame of the third type to the second encapsulation block.

6. The equipment according to claim 5, in which the first block is configured for incorporating the said indication into the header of the frame of the first type.

7. The equipment according to claim 5, in which each packet transporting the user data of the IP type contains an indication of quality of service, and in which the second sub-block of the third block is furthermore configured for transposing the said indication of quality of service into the header of the frame of the third type encapsulating the said packet.

8. The equipment according to claim 5, in which the control means are furthermore capable of routing the frames of the first type towards the first sub-block of the third encapsulation block then of routing the resulting frames towards the second block.

9. The equipment according to claim 5, comprising a module of the PDCP type incorporating the third encapsulation block.

10. The equipment according to claim 5, forming a wireless communications device, for example a cellular mobile telephone.

* * * * *